United States Patent Office 3,136,404
Patented June 9, 1964

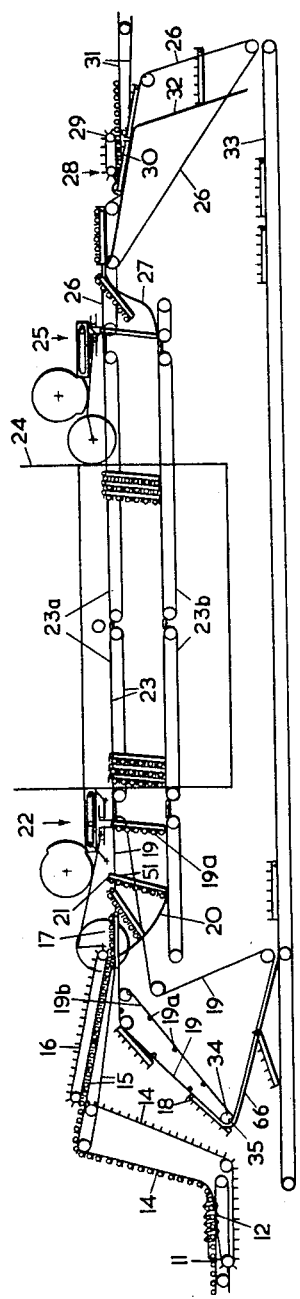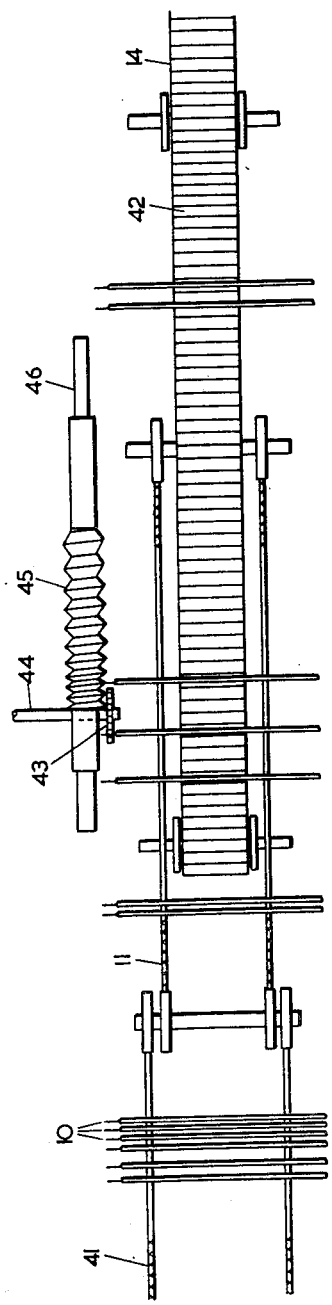

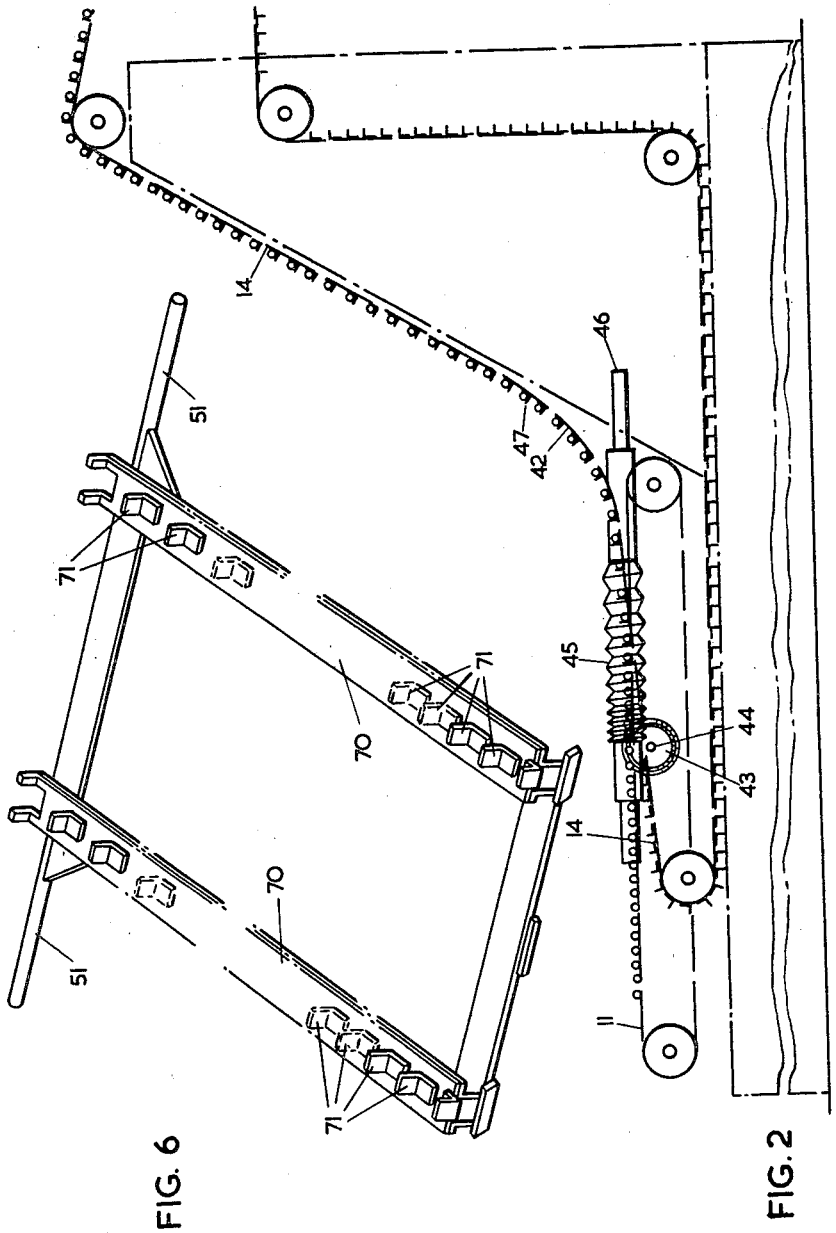

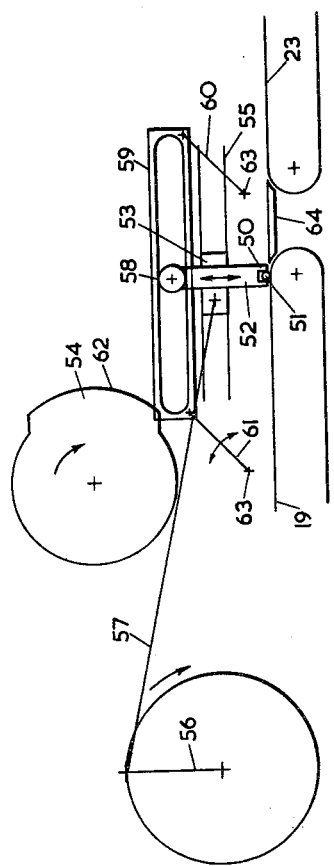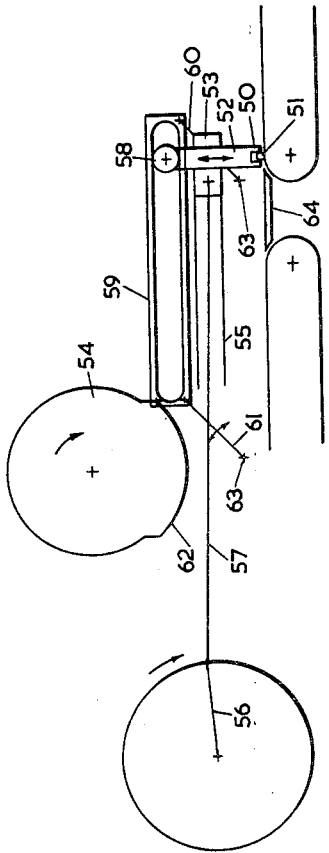

3,136,404
APPARATUS FOR HANDLING ROD-LIKE ARTICLES
Hugh Charles Hebard, High Wycombe, Derek John Humphreys and James Arthur Wilkes, Wolverhampton, and Kenneth William Jeffries, Sedgley, England, assignors to The British Oxygen Company Limited, a British company
Filed Mar. 16, 1962, Ser. No. 180,191
10 Claims. (Cl. 198—34)

The present invention relates to apparatus and processes for the treatment of elongated, generally rod-like articles, such as flux-coated arc welding electrodes which, as one stage in their production, are dried in an oven or furnace.

In such apparatus and processes the need for adequate drying of the articles requires that each article should remain in the oven for a comparatively long period. This can be achieved by using a very long oven but the cost of such an oven is high, and such an oven is wasteful of factory space. Alternatively the articles can be passed and re-passed through a shorter oven by means of a multi-pass system of conveyors, the articles being transferred from one conveyor to the next at each end of the oven, but with this system the risk of jamming the conveyor system is increased and damage to articles such as flux-coated arc welding electrodes which are fragile in their undried state is more likely.

It is an object of the present invention to provide an improved apparatus and process for the drying or other treatment of elongated generally rod-like articles, which are termed "rods" in the remainder of this specification and in the claims.

According to the present invention, apparatus for conveying rods through a treatment plant comprises a conveyor on which the rods may be carried side by side at a relatively high speed towards a treatment plant, means for automatically transferring the rods from the conveyor to a succession of rod carriers, each of which is constructed to carry several rods side by side, means for passing the rod carriers on edge at a relatively slow speed through the treatment plant with the distance between successive rod carriers being less than their length so that the number of rods passing through unit length of the treatment plant may be substantially greater than the number of rods per unit length of the conveyor, and means for automatically unloading rods from rod carriers leaving the treatment plant.

Means may be provided for conveying the rod carriers at a relatively high speed during loading thereon of rods by the automatic transfer means, and a decelerating device may be arranged to decelerate each loaded rod carrier to the relatively slow speed at which the rod carriers are passed through the treatment plant.

An accelerating device may be arranged to accelerate rod carriers after they have passed through the treatment plant, and means may be provided for returning the rod carriers at relatively high speed from an unloading position to the loading position. Either or both of the accelerating and decelerating devices may include a crank-operated reciprocating member arranged to control the forward movement of a rod carrier from a conveyor moving at one speed to a conveyor moving at another speed.

The means for automatically transferring the rods may comprise a spacer unit arranged to deliver rods side by side and spaced from one another onto rod carriers moving in succession through a loading position. The spacer unit may include a toothed wheel mounted to one side of the conveyor, the tooth spacing being such that only one rod end can be located between adjacent teeth adapted to feed the ends of the rods singly to a variable pitch worm, whose drive is coupled to that of the toothed wheel, which produces a predetermined minimum spacing between the rods. A second conveyor having means for maintaining the predetermined minimum spacing between the rods may be arranged to receive rods from the worm and to convey them to the loading point. In the proximity of the worm the second conveyor may be provided with a series of transverse plates or plates forming a series of similar compartments to receive the rods.

Also according to the present invention, a continuous process for drying rods comprises continuously loading the rods on to a succession of moving rod carriers when the rod carriers are in a substantially horizontal position, tilting the rod carriers on edge, decelerating the rod carriers to a relatively slow speed, passing the rod carriers through a drying oven at this relatively slow speed, accelerating the rod carriers to a faster speed at the exit of the oven, restoring the rod carriers to a substantially horizontal position, unloading the rod carriers, and returning the rod carriers to the loading position.

The decelerating device may include a claw member adapted to take control of the trays as they leave the fast conveyor, the claw member being controlled to slow the trays down to the speed of the slow conveyor. The claw member comprises the lower end of, or is mounted on a movable pillar which is itself mounted so as to be vertically slidable in or on a block. The vertical movement of the pillar is controlled by a cam as will be described later. The block is mounted to be horizontally slidable in a guideway, and is attached to a crank via a connecting arm. Revolution of the crank thus causes the block to reciprocate in the guideway. The length of the crank and its speed of revolution are chosen so that (i) when the claw is over the end of the fast conveyor the velocity of the block is equal to that of the fast conveyor; the crank may conveniently be at top dead centre at this time; and (ii) when the claw is over the beginning of the slow conveyor the velocity of the block is equal to that of the slow conveyor; the crank may conveniently be at about 80° to top dead centre at this time.

The cam which controls the vertical movement of the pillar and claw is geared to the crank drive and is shaped so that the claw is moved downwards by the cam to engage and take control of the tray as the tray reaches the end of the fast conveyor, and upwards to release the tray as soon as the tray reaches the slow conveyor. Between the conveyors the weight of the tray loaded with the rods is taken on a skid bar joining the two conveyors. By this means the trays are positively controlled by the gradually decelerating claw member while their speed is changed from that of the fast conveyor to that of the slow conveyor. An accelerating device similarly constructed and working in reverse on exactly the same principle is provided at the exit end of the oven.

The vertical movement of the pillar and claw may alternatively be controlled by any device equivalent to a cam which performs the function of moving the pillar and claw downwards and upwards at the appropriate times.

A specific embodiment of the invention applied to the drying of flux-covered welding rods will now be described with reference to the drawings accompanying this complete specification in which FIGURE 1 is a diagrammatic side elevation of the whole of the apparatus including rod conveyors, a tray conveyor, and a drying oven, FIGURE 2 is a diagrammatic side elevation on a larger scale than FIG. 1 of the rod spacing unit which transfers the rods from the first conveyor to the second conveyor, FIGURE 3 is a diagrammatic plan view of the rod spacing unit, FIGURE 4 is a diagrammatic side elevation on a larger scale than FIG. 1 of the tray decelerating unit which transfers the rod carrying trays from the high-speed tray conveyor to the slow speed tray conveyor, the unit being shown in the position where it is about to take a tray off the fast conveyor, and FIGURE 5 is a view of the unit shown in FIGURE 4 in which the unit is about to deposit the tray on the slow conveyor.

FIGURE 6 shows the tray used in this apparatus.

Referring to FIGURE 1, manual flux-covered welding electrodes or rods 10 arrive randomly spaced on a conveyor 11 and pass to a rod spacing unit 12. The conveyor 11 comprises two horizontally arranged parallel endless belts spaced apart by a distance less than the length of a rod. The belts are usually driven at the same speed but the speed of one of the belts may be increased or decreased to maintain the rods perpendicular to their direction of travel. An endless conveyor unit 14, which is provided with a series of compartments each constructed to accommodate a predetermined number of rods, in this instance one, overlaps part of the conveyor 11. The conveyor 14 ascends at a small angle (approximately 5°) to the horizontal. The rod spacing unit 12, which will be described in more detail hereafter, loads one rod into each compartment. The conveyor 14 then ascends at a steeper angle, approximately 65° to the horizontal, to bring the rods to the level of the drying oven 24. The rods are then transferred to an endless belt conveyor 15 on which their spacing is maintained by a downwardly facing slatted belt 16 parallel to conveyor 15, which is driven in phase with and at the same speed as conveyor 14.

The rods are then loaded onto trays 17 which are transported around a closed path by means of a sequence of conveyors which collectively constitute a tray conveying unit. The empty trays, one of which is seen at 18, are fed to the loading position by means of the conveyors 19 and 19b.

The conveyor 19 comprises two parallel endless chains which are spaced apart by a distance slightly greater than the width of the trays; these chains having U-shaped hooks mounted on them to engage cylindrical bars projecting laterally from each side of one end of the trays. The conveyor 19b also comprises two parallel endless chains which are spaced apart by a distance slightly greater than the width of the trays; but in this conveyor the chains are connected by a number of parallel crosspieces 19a which are arranged so that each crosspiece can support a tray engaged by a corresponding pair of hooks on the conveyor 19. The trays interlock to provide a continuous surface onto which the rods may be deposited. The trays loaded with rods are then gradually swung into a near-vertical position, the rear end of each tray sliding on a skid 20 and the front or upper end 21 remaining attached to the conveyor 19. The trays are then spaced apart by a distance equal to their length, (i.e., approx. 3½ feet). The trays are next slowed down by a decelerating unit, generally indicated at 22, which is depicted in detail in FIGURES 4 and 5 and will be described later. The unit 22 slows the trays down so that the distance between adjacent trays is approximately two inches. On leaving the decelerating unit 22 the trays are attached to the conveyor 23 which passes through the drying oven 24 at a speed slow enought to allow the rods on each trys to be thoroughly dried.

The conveyor 23 comprises two upper pairs of parallel endless chains 23a, and two lower pairs of parallel endless chains 23b. The chains 23a are substantially the same as the chains in the conveyor 19 to engage the cylindrical bars on the trays, and the chains 23b are spaced apart at a distance slightly less than the width of the trays so as to support the lower ends of the trays. The drying oven is of conventional construction for convection treatment and will not be further described. In one apparatus in accordance with the present invention the trays are conveyed through the loading position at a speed of 10 inches per second, and are conveyed through the drying oven at a speed of half an inch per second.

Having been dried, the trays of rods leave the oven and reach the accelerating unit 25 by which the trays are transferred to a fast conveyor 26. This conveyor 26 is similar to the conveyor 19 in that it comprises two parallel endless chains which are spaced apart by a distance slightly greater than the width of the trays; these chains having U-shaped hooks mounted on them to engage the cylindrical bars on the trays. When the trays have been transferred to the conveyor 26 the U-shaped hooks engage the bars which are now at the forward end of the trays to propel the trays toward the unloading position 28; the rear ends of the trays being supported on and lifted up by a suitably shaped skid plate 27. As the trays approach the unloading position, the rear ends of the trays are transferred to a second skid plate 32 which is positioned with respect to the conveyor 26 to locate the trays at the required inclination as they reach the unloading position 28. At this unloading position the conveyor 26 is travelling on a decline and the rods on the trays are scooped off by a stationary plate 30 which is also inclined downwardly but at a smaller angle to the horizontal than the conveyor 26. The rods slide down the stationary plate under the restraining influence of a top belt 29 and onto an output conveyor 31 which is arranged to transport them either to the next stage in the manufacturing process or to the packing, dispatch, or storage section. The trays are then lowered by the conveyor 26 onto a return conveyor 33. Each tray is maintained substantially horizontal during this lowering with the cylindrical bars supported in the conveyor hooks and the rear end of the tray resting on the skid plate 32. The return conveyor 33 passes beneath the skid plate 32 and the oven to convey the trays to where they are picked up by the conveyor 19 which transfers them into the loading position. The return conveyor 33 comprises three parallel endless chains with the two outer chains spaced apart at a distance slightly greater than the width of the trays, and the central chain disposed midway between them. The outer chains have U-shaped hooks mounted on them to engage the cylindrical bars on the trays so as to propel the trays which rest in the horizontal position on these hooks and the central chain. The trays on this return conveyor 33 are at a pitch slightly in excess of a tray length. As the trays pass along the conveyor 33 beneath the conveyor 19, the now inverted U-shaped hooks on the conveyor 19 engage the cylindrical bars which are now on the trailing end of the trays to push the bars onto the lower end of two parallel skid bars 66 which extend from the conveyor 33 to the pulleys 35 supporting part of the conveyors 19 and 19b. These skid bars 66 are spaced apart at a distance slightly greater than the width of the trays to support the cylindrical bars as they are pushed along the skid bars by the hooks so that the trays are progressively inclined to the horizontal as the bars approach the pulleys 35. When the hooks engaging the bars pass round the pulleys 35, they are inclined upwardly to support the tray bars thereby reversing the trays so that the previously trailing ends then become the leading ends. As the trays pass from the pulleys 35 to the loading position, they are propelled by the hooks on the conveyor 19 and supported by the crosspieces 19a on the conveyor 19b which also passes round the pulleys 35. The trays are then ready to be loaded with rods from conveyor 15 and to make another circuit; the trays at this point being end-to-end. The conveyors are all mechanically coupled together and are driven in phase by a number of electric motors the number of trays in the circuit and the speeds of the conveyors are chosen so that the loading, drying, and unloading of the rods can take place continuously and uninterruptedly. The conveyors are preferably chain conveyors, and in known manner means are provided for compensating for wear and heat expansion.

Referring now to FIGURES 2 and 3, which show the rod spacing unit in greater detail, the rods arrive randomly spaced on a conveyor 41, which consists of two parallel endless belts or chains, and are transferred to a similar conveyor 11. A conveyor 14, also consisting of two parallel endless chains, and provided with blades forming compartments 42 is situated beneath and partially overlapping conveyor 11. Over the first (overlapping) part of its length the conveyor 14 rises at a small angle to the horizontal, but it later rises more steeply, as is best seen in FIG. 2. The two angles are blended by a radius, the conveyor 14 being constrained to keep this shape by stationary skid bars which guide the chains of the conveyor 14. A toothed wheel 43 mounted on a horizontal shaft 44 is arranged on one side of the conveyors and level with the ends of the rods. The notches between the teeth of this wheel are large enough to accommodate the end of one rod only. The toothed wheel 43 takes control of the ends of the rods while their weight continues to be borne by the conveyor 11 and brings the ends of the rods in turn into the thread of a worm 45. The worm 45 is mounted on a spindle 46 which is parallel to the conveyor 11, and is geared to toothed wheel 43 by a gear box (not shown) so that the worm 45 makes one revolution for one tooth movement of the wheel 43. Thus successive rods are placed with their ends controlled by successive troughs of the thread of the worm 45. The first part of the thread of worm 45 is of variable pitch and as the rod ends travel down the thread the rods are spaced apart a distance which is equal to that between adjacent troughs at the end of the worm, which distance is arranged to be equal to that between adjacent compartments on the conveyor 14, i.e. approximately one inch. The latter part of the thread of the worm is such that the rods are kept at this spacing over a horizontal distance of 3–4 inches. The conveyor 14 rises to the horizontal level of the conveyor 11 at a point opposite the end of the worm thread and receives the rods in successive compartments as the rods reach the end of the worm thread. The blades or plates 47 which constitute the division between the compartments 42 on the conveyor 14 are shaped so as to guide the rods into the compartments in the event that the rods are not quite at right angles to the conveyor 14. The blades are preferably tapered across the conveyor so that the highest point of the blades is nearest the worm 45, and as the conveyor 14 rises this point of the blade is inserted between the rods whose ends are under control of the worm thread. As the remainder of the blade rises the point of contact of the blade and rod gradually progresses along the rod thus guiding the rod gently into the compartment.

The conveyor 15 comprises two parallel endless belts spaced apart by a distance which is slightly greater than the width of the conveyor 14 but less than the length of the rod being conveyed. This spacing enables the rods to be transferred from the conveyor 14 to the conveyor 15 without the blades 47 fouling the belts of the conveyor 15.

FIGURES 4 and 5 illustrate the decelerating device for changing the speed of the trays just prior to their entry into the drying oven (not shown in FIGS. 4 and 5). The decelerating device includes a claw member 50 adapted to take control of the projecting bar of each tray shown at 51 as the trays leave the fast conveyor 19, the claw member being controlled to slow the trays down to the speed of the slow conveyor 23. The claw member 50 comprises the lower end of, or is mounted on a moveable pillar 52 which is itself mounted so as to be vertically slidable in or on a block 53. The vertical movement of the pillar 52 is controlled by a cam 54 as will be described later. The block 53 is mounted to be horizontally slidable in a guideway 55, and is attached to a crank 56 via a connecting arm 57. Revolution of the crank thus causes the block 53 to reciprocate in the guideway 55. The length of the crank and its speed of revolution are chosen so that (i) when the claw is over the end of the fast conveyor the velocity of the block is exactly equal to that of the fast conveyor; the crank may conveniently be at top dead centre at this time; and (ii) when the claw is over the slow conveyor the velocity of the block is exactly equal to that of the slow conveyor; the crank may conveniently be at about 80° to top dead centre at this time.

The pillar 52 is attached to a slider 58 which is free to slide in a slotted member 59. The slot in this member 59 is parallel to the guideway 55 and the member is pivotally mounted on swinging links 60, 61. The slotted member 59 is biassed towards and contacts the cam surface 62 of the cam 54, and revolution of this cam causes the slotted member 59 to swing about the anchoring points 63 of the links 60, 61, the slot remaining parallel to the guideway 55. The vertical position of the pillar 52 and claw member 50 is thereby altered. The cam 54 is geared to the drive of the crank 56 by means not shown and is driven at such a speed that the claw member 50 is moved downwards to engage the part of the tray 51 just as the tray reaches the end of the fast conveyor 19 (i.e. position shown in FIG. 4) and such that the claw member 50 is moved up to release the part of the tray 51 as soon as it is fully on slow conveyor 23 (i.e. position shown in FIG. 5). Between these two conveyors the weight of the tray is taken by skid bar 64, and another bar (not shown) may be provided to support the lower ends of the trays.

As an alternative to use of a claw member 50 as shown, the crank-operated reciprocating member may have an L-shaped part adapted to engage the projecting bars 51 of the trays to retard or accelerate the bars in the decelerating device and accelerating device, respectively. The horizontal arm of the L is uppermost, and the vertical arm of the L extends downwardly from the horizontal arm at the rearmost portion of the pillar 52 taken in the direction of movement of the rod; this rearmost portion being on the left hand side of the pillar 52 as illustrated in FIGURES 4 and 5. This L-shaped part operates in substantially the same way as the claw member 50 except that the L-shaped part does not have to be raised when releasing the projecting bars 51. The L-shaped part may release the bars 51 onto either the next conveyor or onto a transfer skid similar to the skid bar 64 which is cam operated to release the bars 51 onto the next conveyor at the appropriate instant.

A particularly convenient construction of rod carrier has a tray which consists of a rectangular frame 70 carrying two rows of blades or plates 71, as shown in FIGURE 6, one row on each longer side of the frame. These blades project at right angles from the frame and the spaces between them form rod-carrying compartments each large enough to receive one rod. Two cylindrical bars 51 project from the longer sides of the frame at or near, and parallel to one of its shorter sides, to enable the tray to be temporarily attached to the various conveyors, which are provided with co-operating hooks, not shown but of known construction, for this purpose. One of these bars can be seen in FIGS. 1, 4 and 5 at 51. The co-operating hooks may be U-shaped members attached to certain of the links of the chains forming the conveyor. The projecting bars 51 on the trays rest in these U-shaped members when the U-shaped members are facing upwardly as they pass along the top of the conveyor; and a guide bar 66 (FIG. 1) may be provided on which bars on the tray rest while they are under control of the U-shaped members when the U-shaped members are facing downwardly or outwardly, as, for instance, on the lower portion of conveyor 19.

The use of the apparatus and process of the present invention facilitates the high-speed yet thorough drying of rod-like articles as one stage in a high-speed production process and overcomes many disadvantages hitherto encountered.

We claim:

1. Apparatus for conveying rods through a treatment plant comprising a conveyor on which the rods may be carried side by side at a relatively high speed towards a treatment plant, means for automatically transferring the rods from the conveyor to a succession of rod carriers, each of which is constructed to carry several rods side by side, means for passing the rod carriers on edge at a relatively slow speed through the treatment plant with the distance between successive rod carriers being less than their length so that the number of rods passing through unit length of the treatment plant may be substantially greater than the number of rods per unit length of the conveyor, and means for automatically unloading rods from rod carriers leaving the treatment plant.

2. Apparatus as claimed in claim 1 wherein the means for automatically transferring the rods comprises a spacer unit arranged to deliver rods side by side and spaced from one another onto rod carriers moving in succession through a loading position.

3. Apparatus as claimed in claim 2 wherein the spacer unit comprises a toothed wheel arranged to feed the ends of the rods singly to a variable pitch worm coupled to the wheel, in which the tooth spacing of the wheel is such that only one rod end can be located between adjacent teeth, and the pitch of the worm is dimensioned to produce a predetermined minimum spacing between the rods.

4. Apparatus as claimed in claim 3 wherein a second conveyor having means for maintaining the predetermined minimum spacing between the rods is arranged to receive rods from the worm and to convey them to the loading position.

5. Apparatus as claimed in claim 4, wherein the second conveyor in the proximity of the worm is provided with a series of transverse plates or blades forming a series of similar compartments to receive the rods.

6. Apparatus as claimed in claim 1, wherein means are provided for conveying the rod carriers at a relatively high speed during loading thereon of rods by the automatic transfer means, and a decelerating device is arranged to decelerate each loaded rod carrier to the relatively slow speed at which the rod carriers are passed through the treatment plant.

7. Apparatus as claimed in claim 6, wherein an accelerating device is arranged to accelerate rod carriers after they have passed through the treatment plant, and means are provided for returning the rod carriers at relatively high speed from an unloading position to the loading position.

8. Apparatus as claimed in claim 7 wherein the accelerating device includes a crank-operated reciprocating member arranged to control the forward movement of a rod carrier from a conveyor moving at one speed to a conveyor moving at another speed.

9. Apparatus as claimed in claim 6, wherein the decelerating device includes a crank-operated reciprocating member arranged to control the forward movement of a rod carrier from a conveyor moving at one speed to a conveyor moving at another speed.

10. A continuous process for drying rods comprising continuously loading the rods onto a succession of moving rod carriers when the rod carriers are in a substantially horizontal position, tilting the rod carriers on edge, decelerating the rod carriers to a relatively slow speed, passing the rod carriers through a drying oven at this relatively slow speed, accelerating the rod carriers to a faster speed at the exit of the oven, restoring the rod carriers to a substantially horizontal position, unloading the rod carriers, and returning the rod carriers to the loading position.

References Cited in the file of this patent
UNITED STATES PATENTS 1,830,359     Hamel _____ Nov. 3, 1931

FOREIGN PATENTS 551,623     Italy _____ June 8, 1955